United States Patent [19]

Tanamachi et al.

[11] Patent Number: 5,532,569
[45] Date of Patent: Jul. 2, 1996

[54] INVERTER CONTROL APPARATUS

[75] Inventors: Tokunosuke Tanamachi; Kiyoshi Nakamura, both of Katsuta; Kiyoshi Nakata, Ibaraki-ken; Yoshio Tsutsui; Wataru Miyake, both of Katsuta; Katsuaki Suzuki, Kitaibaraki, all of Japan

[73] Assignee: Hitachi, Ltd., Tokyo, Japan

[21] Appl. No.: 131,308

[22] Filed: Oct. 4, 1993

Related U.S. Application Data

[63] Continuation-in-part of Ser. No. 201,449, Jun. 2, 1988, Pat. No. 5,250,890.

[51] Int. Cl.$^6$ .................................................. H02P 5/34
[52] U.S. Cl. ........................................ 318/802; 318/811
[58] Field of Search .................................. 318/599, 801, 318/803, 805, 807, 810, 811, 809, 798, 802; 388/811, 831; 363/37, 41, 95, 39, 135, 97, 79, 98, 136, 56, 35

[56] References Cited

U.S. PATENT DOCUMENTS

| | | | |
|---|---|---|---|
| 3,335,518 | 1/1967 | Yatsue et al. | |
| 3,753,063 | 8/1973 | Graf. | |
| 3,829,754 | 8/1974 | Rattig. | |
| 3,909,687 | 9/1975 | Abbondanti | 318/807 |
| 4,054,818 | 10/1977 | Risberg. | |
| 4,409,534 | 10/1983 | Bose. | |
| 4,437,050 | 3/1984 | Overzet | 318/807 |
| 4,486,299 | 10/1984 | Muto. | |
| 4,527,226 | 7/1985 | Glennon. | |
| 4,685,042 | 8/1987 | Severinsky. | |
| 4,716,347 | 12/1987 | Fujimoto. | |
| 4,723,201 | 2/1988 | Tanamachi et al. | |
| 4,733,146 | 3/1988 | Hamby | 318/807 |
| 4,788,485 | 11/1988 | Kawagishi et al. | |
| 4,825,131 | 4/1989 | Nozaki et al. | 318/52 |
| 4,953,860 | 6/1990 | Kirchberg et al. | 363/39 |
| 4,975,823 | 12/1990 | Rilly et al. | 363/56 |
| 5,231,339 | 7/1993 | Kishimoto et al. | 318/807 |

FOREIGN PATENT DOCUMENTS

| | | |
|---|---|---|
| 61-48356 | 5/1981 | Japan. |
| 56-49693 | 10/1986 | Japan. |
| 254691A | 11/1987 | Japan. |

OTHER PUBLICATIONS

"Rectifier-Inverter Frequency Changers with Suppressed DC Link Components", P. Ziogas, et al. IEEE Transactions on Industry Applications IA-22, Nov./Dec. 1986, No. 6.

"Inverter Drive System for AC Electric Rolling Stocks", K. Nakamura et al., Hitachi Research Laboratory, Hitachi Review, vol. 37, 1988, No. 6.

"Restraint Method of Beat Phenomenon on Converter-Inverter System", by K. Nakamura et al., T. IEE Japan, vol. 109-D, No. 5, 1989.

"A Beatless Control of Inverter-Induction Motor System Driven by a Rippled DC Power Source", by K. Nakamura et al., T. IEE Japan, vol. 109-D, No. 7, 1989.

*Primary Examiner*—John W. Cabeca
*Attorney, Agent, or Firm*—Antonelli, Terry, Stout & Kraus

[57] ABSTRACT

An electric railway vehicle control system including a converter for converting a single-phase a.c. voltage to a d.c. voltage, a PWM inverter for inverting the d.c. output of the converter to a variable voltage, variable frequency a.c. voltage, and a three-phase induction motor supplied with the a.c. output voltage of the inverter to drive electric railway vehicles. The control system further includes a unit for controlling the output voltage of the inverter in a variable voltage, variable frequency mode for changing the output voltage substantially relative to a change in the output frequency thereof and in a constant voltage, variable frequency control mode for fixing the output voltage to a substantially constant value, and a unit for detecting a rectification ripple in a frequency band including a frequency double the frequency of the single-phase a.c. voltage included in the d.c. input voltage to the inverter.

21 Claims, 13 Drawing Sheets

FIG. 2A OUTPUTS OF 71 AND 72

FIG. 2B OUTPUT OF 73 { FOR UP / FOR VP / FOR WP }

FIG. 2C OUTPUT VOLTAGE OF 4 (U-V VOLTAGE)

$fe \gg fo$ $fe \fallingdotseq fo$ $fe \ll fo$

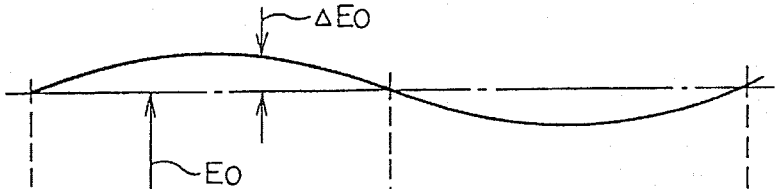
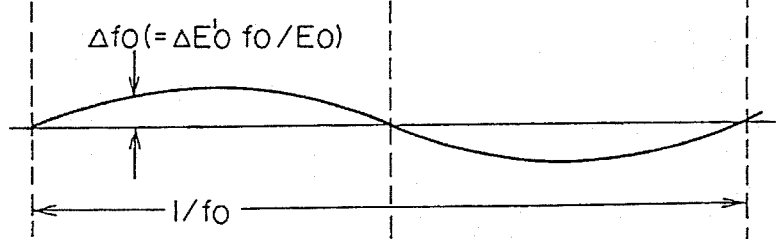
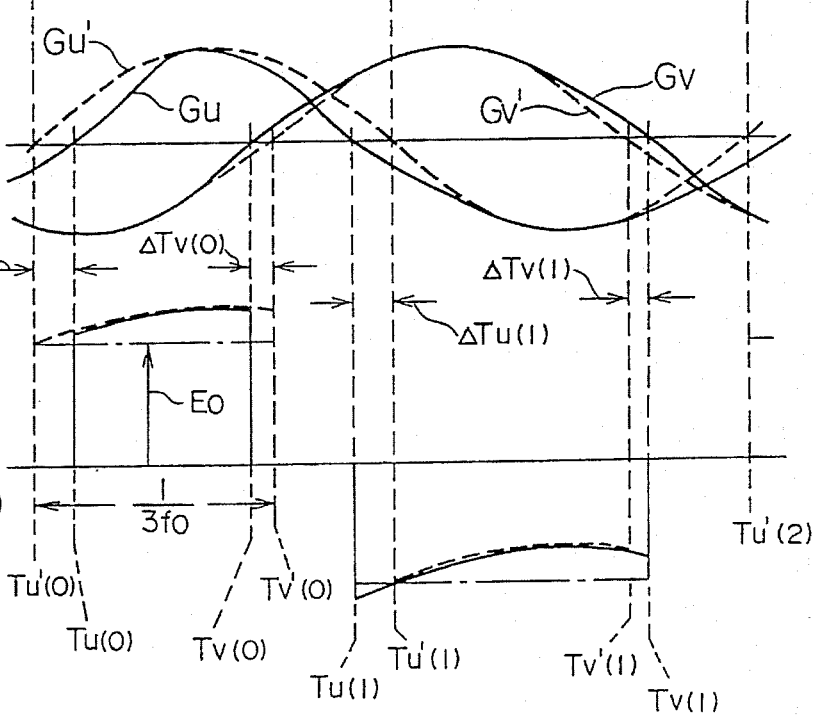

$f = f_0$
(NO $\Delta f_0$)

E
TORQUE OF 5
1500V 750N·m 50ms
fs
10Hz
CURRENT OF 5
(U-PHASE)
125A $f = f_0 + \Delta f_0$,
$\alpha = 0°$ IN
EQUATION(2)

E
TORQUE OF 5
$\Delta f_0 + f_s$
CURRENT OF 5
(U-PHASE)

$f = f_0 + \Delta f_0$,
$\alpha = -5°$ IN
EQUATION(2)

E
TORQUE OF 5
$\Delta f_0 + f_s$
CURRENT OF 5
(U-PHASE)

FIG. 7A

INPUT VOLTAGE E OF 4, WITHOUT PULSATING COMPONENT ΔEo

TORQUE OF 5 — Tav

CURRENT OF 5 — ipn

FIG. 7B

INPUT VOLTAGE E OF 4, WITH PULSATING COMPONENT ΔEo

TORQUE OF 5 — ΔTb, Tav

CURRENT OF 5 — ipb

INVERTER CONTROL APPARATUS

CROSS-REFERENCE TO RELATED APPLICATIONS

This application is a continuation-in-part application of U.S. application Ser. No. 201,449, filed Jun. 2, 1988 which is incorporated by reference herein, now U.S. Pat. No. 5,250,890.

BACKGROUND OF THE INVENTION

This invention relates to an inverter control apparatus, and more particularly to an apparatus suitable for controlling an inverter which converts a d.c. output voltage of an a.c./d.c. converter into a variable a.c. voltage having a variable frequency.

Japanese Patent Publication No. 61-48367 (1986) is known as one of prior art publications disclosing a control method of this kind. Japanese Patent Publication No. 61-48356 notices the fact that, when an a.c./d.c. converter converts an a.c. voltage into a d.c. voltage, and the d.c. output voltage of the converter is applied to a pulse width modulation inverter to be converted into a variable a.c. voltage having a variable frequency (VVVF), the output voltage of the inverter pulsates, and, especially, a beat phenomenon occurs at a specific output frequency of the inverter, because the output voltage of the a.c./d.c. converter, that is, the input voltage of the inverter includes a pulsating component (rectification ripples which occurred during rectification). According to the method of disclosed in Japanese Patent Publication No. 61- 48356 which solves the above problem, the ratio between the amplitude of a sine wave signal and that of a carrier signal of triangular waveform, that is, the pulse width of a PWM signal is adjusted to deal with a variation of the inverter input voltage, so that the inverter output voltage can be freed from any variation.

Also, Japanese Patent Application No. 57-52383 proposed to attain the same object discloses a method of controlling a PWM inverter in which a pulse processing technique is used so as to adjust the pulse width of the PWM signal to deal with a variation of the inverter input voltage.

However, these prior art control methods have such a disadvantage that the desired control is not applicable to a voltage range in which the output voltage of the inverter attains its maximum level and any further voltage control is impossible. That is, the desired control is not applicable because the number of pulses included in one cycle of the inverter output voltage is only one, and the inverter output voltage is maintained constant at its maximum level.

Also, electric railway vehicles, as will be later described, receive a single-phase a.c. voltage from an aerial line. If this single-phase a.c. voltage is converted to a d.c. voltage by a converter, a large rectification ripple is present particularly at a frequency double the frequency of the single-phase a.c. voltage, thereby aggravating a beat phenomenon.

SUMMARY OF THE INVENTION

It is an object of the present invention to provide an apparatus for controlling an inverter so as to minimize an undesirable beat phenomenon of an inverter output voltage attributable to a pulsating component included in an inverter input voltage.

In one aspect of the present invention, the operating frequency of the inverter is adjusted in a way in which the product of voltage and time in one half cycle of the inverter output becomes equal to that in the next adjacent half cycle of the inverter output voltage.

In a preferred embodiment of the inverter control apparatus according to the present invention, the slip frequency of an associated induction motor is controlled so as to change the output frequency of the inverter, thereby adjusting the operating frequency of the inverter in a way in which the product of voltage and time in one half cycle of the inverter output voltage becomes equal to that in the next adjacent half cycle of the inverter output voltage.

Thus, an unbalance between the adjacent positive and negative half cycles of the inverter output voltage attributable to the pulsating component included in the inverter input voltage can be greatly decreased so as to minimize the beat phenomenon of the inverter output voltage.

BRIEF DESCRIPTION OF THE DRAWINGS

FIGS. 2A, 2B, 2C to 11 illustrate the operation of the embodiment of the present invention shown in FIG. 1 in which:

FIGS. 2A, 2B and 2C illustrate the principle of pulse width modulation by comparison between sine wave signals and a triangular wave signal;

FIG. 3 shows the number of pulses and a corresponding inverter output voltage relative to a reference frequency command for the output frequency of the inverter;

FIGS. 5A, 5B, 5C and 5D illustrate how a beat phenomenon of the inverter output voltage is suppressed;

FIGS. 7A and 7B illustrate the definition of symbols relating to the current and torque of the induction motor;

FIG. 8 shows the results of simulation of the peak current of the induction motor;

FIG. 9 shows the results of simulation of pulsation of the torque of the induction motor;

FIG. 10 is a circuit diagram showing the practical structure of the detectors 141 and 142 used for detecting the pulsating component and d.c. component, respectively, of the inverter input voltage;

FIG. 11 shows the gain and phase characteristics of the detector used for detecting the pulsating component of the inverter input voltage;

DESCRIPTION OF THE PREFERRED EMBODIMENTS

Figure 1:
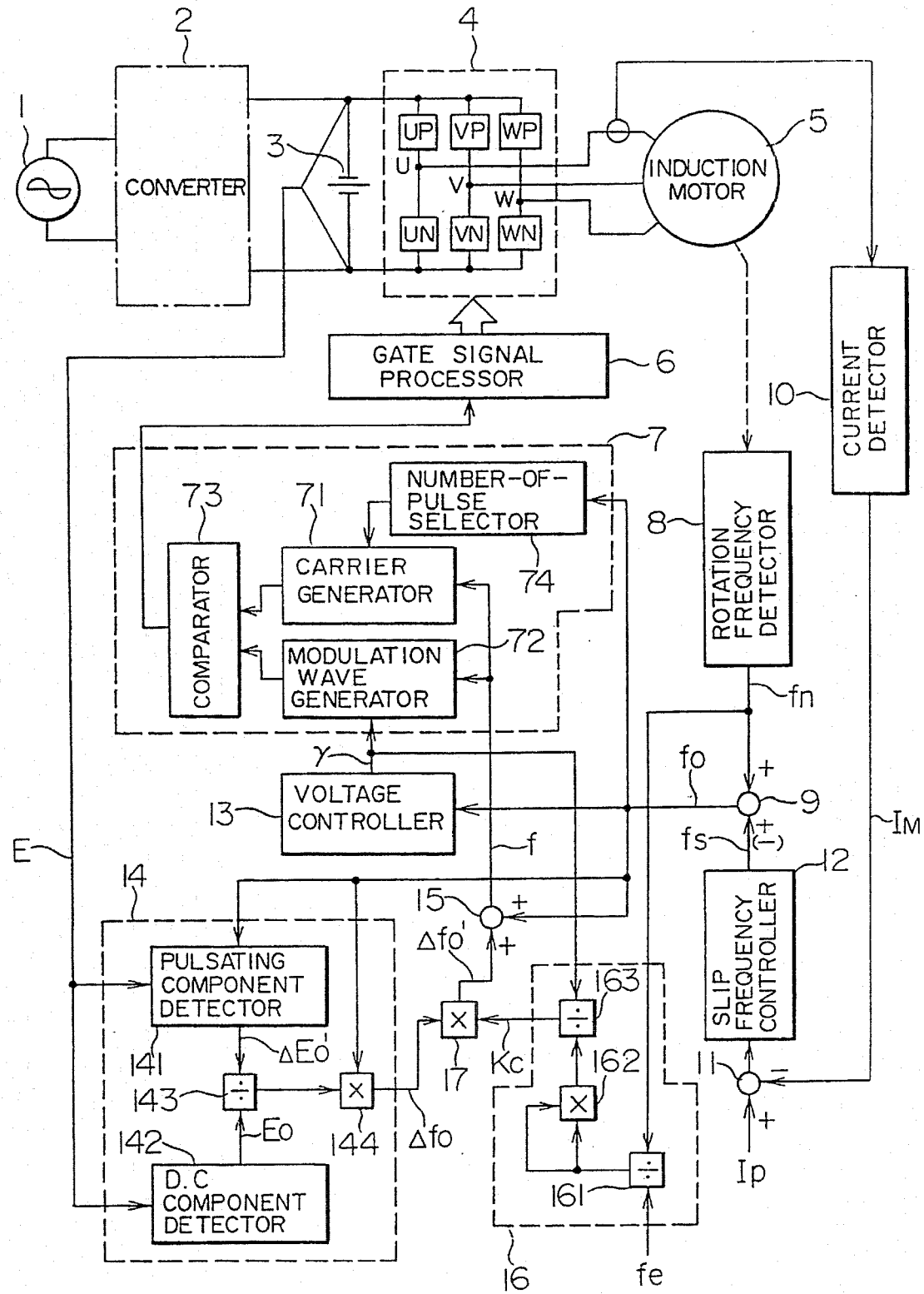
FIG. 1 is a block diagram of an embodiment of the inverter control apparatus of the present invention when used to control an induction motor.

FIG. 1 is a block circuit diagram of a preferred embodiment of the inverter control apparatus when used to control an induction motor.

Referring to FIG. 1, an a.c. voltage supplied from an a.c. power source 1 is converted by an a.c./d.c. converter 2 into a d.c. voltage, and the d.c. output voltage of the converter 2 is smoothed by a filter capacitor 3. A pulse width modulation inverter 4 converts the smoothed d.c. input voltage into a variable a.c. voltage having a variable frequency. The inverter 4 is composed of control switching elements UP to WN which may be GTO thyristors. An induction motor 5 is energized by the inverter 4. A modulation unit 7 includes a carrier generator 71, a modulator wave generator 72, a comparator 73 and a number-of-pulse selector 74. The output of the modulation unit 7 is applied through a gate signal processing circuit 6 to the inverter 4 to turn on-off the control switching elements UP to WN of the inverter 4 according to a predetermined sequential order.

In FIG. 1, a rotation frequency detector 8 detects the rotation frequency fn of the induction motor 5. An adder/subtracter 9 adds a slip frequency command fs to the detected value of the rotation frequency fn when the induction motor 5 is in its power running mode, but subtracts the slip frequency command fs from the detected value fn when the induction motor 5 is in its regenerative mode. The resultant output of the adder/subtracter 9 provides a reference frequency command fo (= fn± fs) for the output frequency of the inverter 4. A current detector 10 detects the value Im of current of the induction motor 5, and this detected current value Im is compared with a current command Ip in a comparator 11 which finds the difference between Im and Ip. A slip frequency control unit 12 controls the slip frequency command fs on the basis of the detected difference Im and Ip.

Figure 2:
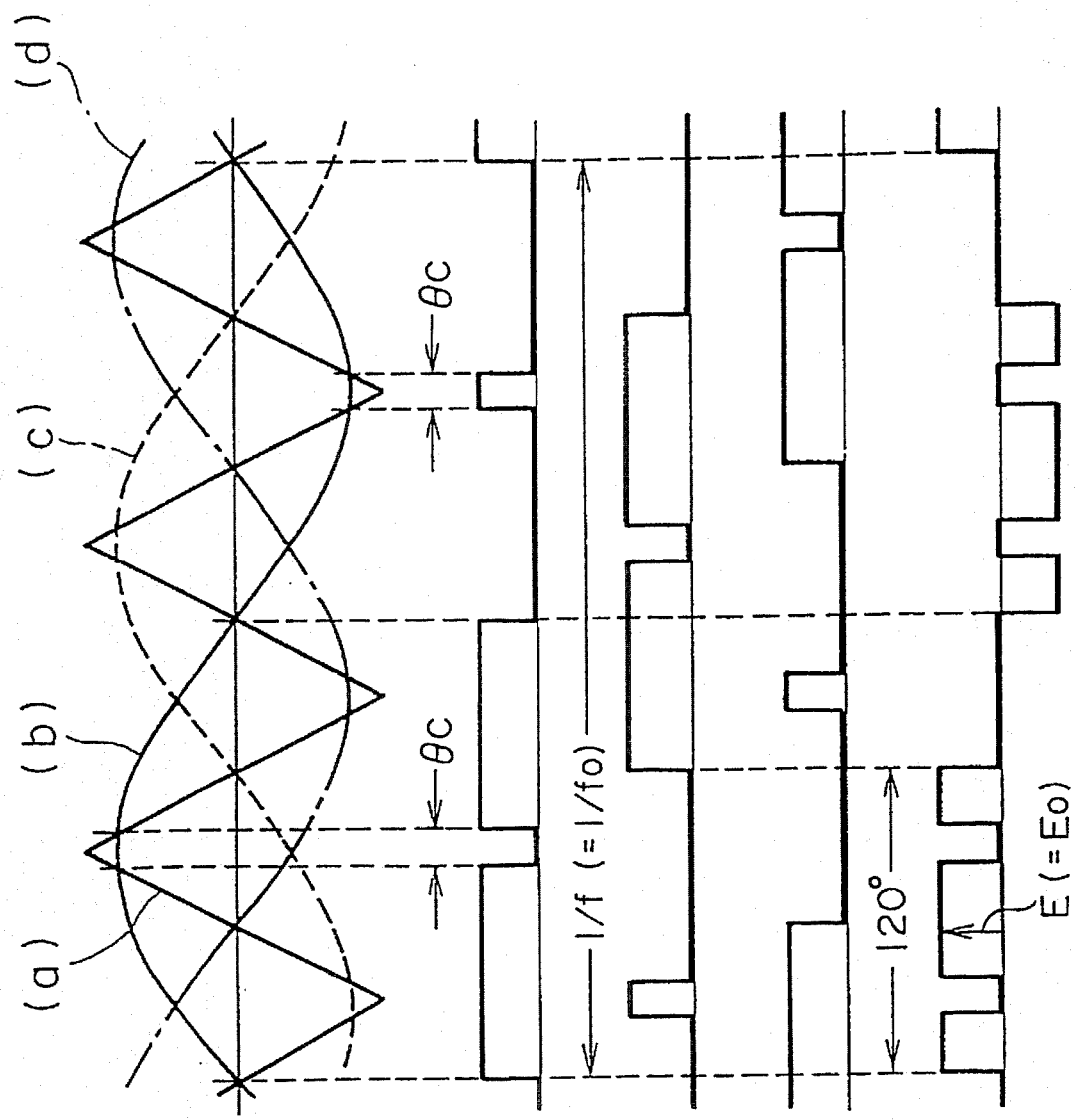

The reference frequency command output fo of the adder/subtracter 9 commanding the output frequency $\underline{f}$ of the inverter 4 is applied to the modulation unit 7. In response to the application of the reference frequency command fo to the modulation unit 7, the modulation wave generator 72 generates U-phase, V-phase and W-phase sine wave signals as shown by (b), (c) and (d) respectively in FIG. 2A, and the carrier generator 71 generates a triangular wave signal as shown by (a) in FIG. 2A. The comparator 73 compares the sine wave signals with the triangular wave signal and generates pulses as shown in FIG. 2B. These pulses are used to trigger the control switching elements UP, VP and WP. Pulses applied to trigger the control switching elements UN, VN and WN have inverted waveforms of those shown in FIG. 2B.

Figure 3:
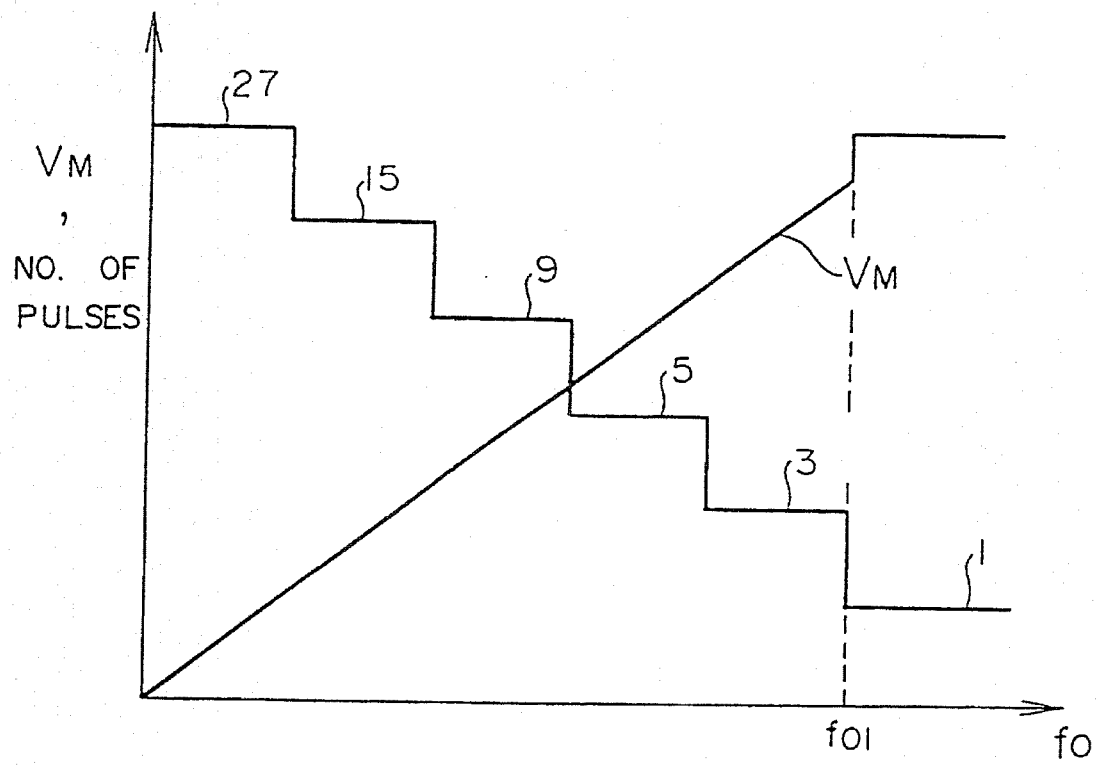

Suppose that the input voltage E of the inverter 4 includes its d.c. component Eo only and does not include any pulsating component ΔEo. In this case, the U–V output voltage of the inverter 5 has a waveform as shown in FIG. 2C, and there is no unbalance between the positive and negative half cycles of the output voltage. The output voltage of the inverter 4 is controlled by controlling the width θc shown in FIG. 2B, that is, by controlling the peak value of the sine wave signals shown in FIG. 2A. Further, the number of pulses included in each half cycle of the output frequency f of the inverter 4, which frequency $\underline{f}$ is now equal to the output frequency fo of the adder/subtracter 9, is controlled by the number-of-pulse selector 74 which changes over the ratio between the frequency of the triangular wave signal and that of the sine wave signals, that is, the frequency of the triangular wave signal shown in FIG. 2A. In the example shown in FIG. 2C, the number of phases is three. FIG. 3 shows the relation between the number of pulses and the output fo of the adder/subtracter 9 providing the reference value of the output frequency $\underline{f}$ of the inverter 4. The number-of-pulse selector 74 changes over the number of pulses in the order of, for example, 27-15-9-5-3-1 as shown in FIG. 3. A voltage control unit 13 calculates the ratio between the peak value of the sine wave signals and that of the triangular wave signal shown in FIG. 2A. That is, the voltage control unit 13 calculates the modulation factor 6 to control the peak value of the sine wave signals, so that, as shown in FIG. 3, the output voltage $V_M$ of the inverter 4 changes continuously relative to the output fo of the adder/subtracter 9 providing the reference value of the output frequency $\underline{d}$ of the inverter 4. It will be seen in FIG. 3 that the output voltage $V_M$ of the inverter 4 shows a jump when the number of pulses is changed over to one from three. This is because a certain length of time is required until the control switching elements UP to WN are completely turned off, and, therefore, the number of pulses cannot be continuously controlled until the width θc shown in FIG. 2B becomes zero, that is, until the output voltage $V_M$ of the inverter 4 attains it maximum level where the number of pulses is one.

Figure 4A:
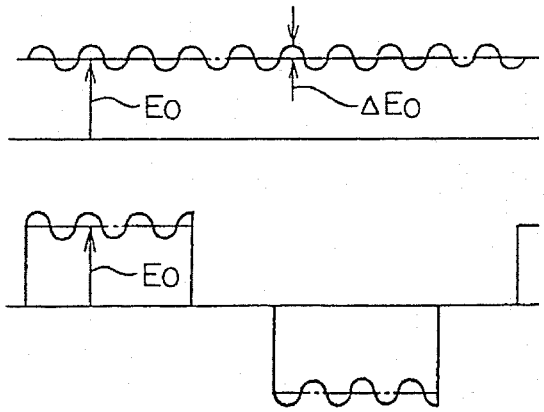
FIGS. 4A, 4B and 4C show the relation between the waveform of the inverter input voltage and that of the inverter output voltage.
Figure 4B:
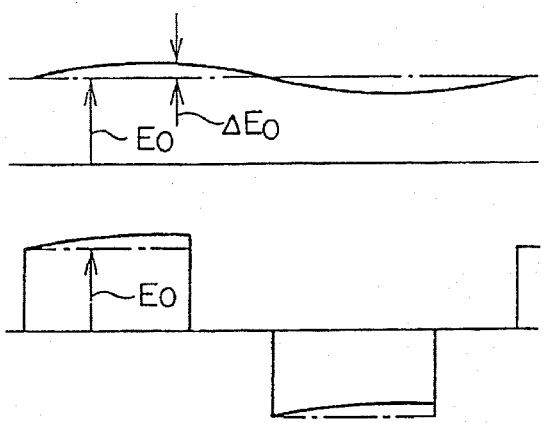
Figure 4C:
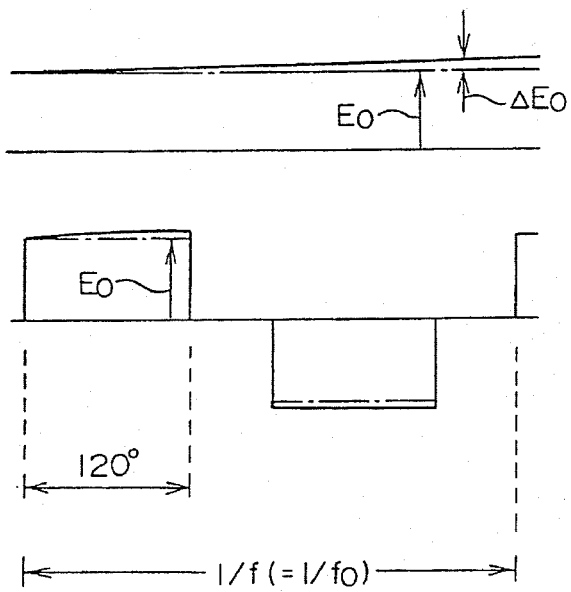

Even the filter capacitor 3 for smoothing the d.c. voltage is connected to the output of the converter 2, the input voltage E of the inverter 4 includes a pulsating component ΔEo attributable to ripples appearing during rectification. Although this pulsating component ΔEo can be suppressed by increasing the capacity of the filter capacitor 3, it cannot be completely removed. The increase in the capacity results in a correspondingly large size of the filter capacitor 3. Therefore, when the pulsating component Eo is taken into account, the input voltage E of the inverter 4 is expressed as E (= the d.c. component Eo+ the pulsating component ΔEo), the relation between the input voltage E and the output voltage (the line voltage) of the inverter 4 is as shown in FIGS. 4A to 4C. In FIGS. 4A to 4C, it is supposed that the modulation factor γ (= the ratio between the peak value of the sine wave signals and that of the triangular wave signal) is γ≧1 in FIG. 2A, and the commanded output frequency f of the inverter 4 is equal to the output fo of the adder/subtracter 9. FIG. 4A shows the relation between the input and the output voltages of the inverter 4 when the frequency fe of the pulsating component ΔEo (which frequency is constant as it is attributable to ripples occurring during rectification) is higher than the output fo of the adder/subtracter 9. FIG. 4C shows the above relation when the frequency fe of the pulsating component ΔEo is lower than the output fo of the adder/subtracter 9. In each of FIGS. 4A and 4C, there is substantially no unbalance between the positive and negative half cycles of the output voltage of the inverter 4. The condition that the frequency fe of the pulsating component ΔEo is higher than the output fo of the adder/subtracter 9 appears when the rotation speed of the induction motor 5 is in its low speed range, and the number of pulses is generally large as will be seen in FIG. 3. The fact that no unbalance occurs between the positive and negative half cycles of the output voltage of the inverter 4 even in such a case can be readily understood from FIG. 4A. FIG. 4B shows the relation between the input and output voltages of the inverter 4 when the frequency fe of the pulsating component ΔEo is approximately equal to the output frequency $\underline{f}$ of the inverter 4 (= the output fo of the adder/subtracter 9). In this case, an unbalance occurs between the positive and negative half cycles of the output voltage of the inverter 4. The magnitude of this unbalance changes in proportion to the difference between the frequency fe of the pulsating component ΔEo and the output frequency $\underline{f}$ of the inverter 4 (= the output fo of the adder/subtracter 9). That is, a beat phenomenon occurs in the output voltage of the inverter 4.

A frequency adjusting unit 14 is provided to adjust the output frequency $\underline{f}$ of the inverter 4. The frequency adjusting unit 14 includes a d.c. component detector 142 detecting the d.c. component Eo of the input voltage E of the inverter 4 and a pulsating or ripple component detector 141 detecting the pulsating component ΔEo of the input voltage E of the inverter 4 with a predetermined phase difference α. The output ΔEo' (|ΔEo'|=|ΔEo|) of the detector 141 is divided in a divider 143 by the output Eo of the detector 142. Then, the output of the divider 143 is multiplied in a multiplier 144 by the output fo of the adder/subtracter 9, and an adjusting factor Δfo (= ΔEo' fo/Eo) for adjusting the output frequency f of the inverter 4 appears from the frequency adjusting unit 10.

The output Δfo of the frequency adjusting unit 14 adjusting the output frequency $\underline{f}$ of the inverter 4 is added in an adder 15 to the output fo of the adder/subtracter 9 to provide the frequency command $\underline{f}$ (+ fo+ Δfo) commanding the output frequency of the inverter 4. Suppose that the ripple factor of the input voltage E of the inverter 4 is K, and the pulsating component ΔEo of the inverter input voltage E pulsates in a sinusoidal fashion with the frequency fe. Then, the input voltage E of the inverter 4 and the frequency command f commanding the output frequency of the inverter 4 are expressed as follows, respectively:

$$E = Eo + \Delta Eo = Eo + KEo \sin(2\pi fet) \quad (1)$$

$$f = fo + \Delta fo = fo + \Delta Eo^1 fo/Eo \quad (2)$$
$$= fo + Kfo \sin(2\pi fet + \alpha)$$

When the frequency command $\underline{f}$ for the output frequency of the inverter 4 is applied to the modulation unit 7, the modulation wave generator 72 generates U-phase, V-phase and W-phase modulation wave signals $G_U$, $G_V$ and $G_W$ expressed as follows, respectively:

$$\begin{aligned} G_U &= \gamma \sin(\theta) \\ G_V &= \gamma \sin(\theta - 2\pi/3) \\ G_W &= \gamma \sin(\theta - 4\pi/4) \end{aligned} \quad (3)$$

$$\theta = 2\pi \int f dt = 2\pi fot + 2\pi \int \Delta fo dt \quad (4)$$
$$= 2\pi fot - Kfo/fe \cos(2\pi fet + d)$$

In equation (3), γ designates the modulation factor (the ratio between the peak value of the modulation wave signals and that of the carrier signal).

FIG. 5A shows the waveform of the input voltage E of the inverter 4, FIG. 5B shows the waveform of the adjusting factor Δfo for adjusting the output frequency $\underline{f}$ of the inverter 4, and FIG. 5C shows the relation between the outputs $G_U$ and $G_V$ of the modulation wave generator 72. In FIGS. 5A, 5B and 5C, it is supposed that the frequency fe of the pulsating component ΔEo of the input voltage E of the inverter 4 is equal to the output fo of the adder/subtracter 9, and the phase difference α between the pulsating component ΔEo and its detected values ΔEo' (|ΔEo'|=|ΔEo|) is α= 0°. It will be especially seen in FIG. 5C that, by the function of the inverter output frequency adjusting factor Δfo included in the second member of the equation (4), the outputs $G_U$ and $G_V$ of the modulation wave generator 72 are now represented by the solid waveforms instead of their previous waveforms represented by the dotted curves. FIG. 5D shows the waveform of the U–V output voltage of the inverter 4 when the number of pulses is one, that is, when the modulator factor γ (= the ratio between the peak value of the sine wave signals and that of the triangular wave signal in FIG. 2A) is γ≧1. It will be seen in FIG. 5D that the inverter output voltage which has been previously represented by the dotted waveform is now represented by the solid waveform, and an unbalance between the positive and negative half cycles of the output voltage of the inverter 4 is greatly decreased.

The amount of unbalance between the positive and negative half cycles of the output voltage of the inverter 4 will be numerically discussed with reference to FIGS. 5A to 5D.

Referring to FIG. 5C, when the outputs of the modulation wave generator 72 are represented by the dotted waveforms, $G_{U'}$ and $G_{V'}$, these outputs $G_{U'}$ and $G_{V'}$ become zero at times $T_{U'}$ and $T_{V'}$ which are expressed as follows, respectively:

$$\left. \begin{aligned} T_{U'}(N) &= N/2fo \\ T_{V'}(N) &= N/2fo + 1/3fo \end{aligned} \right\} (N = 0, 1, 2, \ldots) \quad (5)$$

When the outputs of the modulation wave generator 72 are represented by the solid waveforms, these outputs $G_U$ and $G_V$ become zero at time $T_U$ and $T_V$ which are expressed as follows, respectively:

$$\left. \begin{aligned} T_U(N) &= T_{U'}(N) + \Delta T_U(N) \\ T_V(N) &= T_{V'}(N) + \Delta T_V(N) \end{aligned} \right\} (N = 0, 1, 2, \ldots) \quad (6)$$

From the equations (3) to (6), $\Delta T_U$ and $\Delta T_V$ in the equation (6) are expressed as follows, respectively:

$$\Delta T_U(N) = K/2\pi fe \cos\{2\pi fe (T_{U'} + \Delta T_U) + d\} \quad (7)$$
$$\Delta T_V(N) = K/2\pi fe \cos\{2\pi fe (T_{V'} + \Delta T_V) + d\}$$
$$(N = 0, 1, 2, \ldots)$$

Suppose that the output frequency of the inverter 4 is not adjusted by addition of the adjusting factor Δfo to the output fo of the adder/subtracter 9. That is, suppose that the modulation wave generator 72 generates outputs $G_{U'}$ and $G_{V'}$ shown by the dotted waveforms in FIG. 5C, and the inverter 4 generates the corresponding output voltage shown by the dotted waveform in FIG. 5D. In this case, the product ET' of voltage and time in one half cycle of the output voltage of the inverter 4 is given by the definite integral of the equation (1), as follows:

$$ET'(N) = \int_{T_{U'}}^{T_{V'}} (Eo' + \Delta Eo) dt \quad (8)$$
$$= Eo/3fo - KEo/2\pi fe \{\cos(2\pi fe T_{U'})\}$$
$$= Eo/3fo - K' \sin\{2\pi(fo - fe)N/2fo - \pi fe/3fo\}$$

where
$$K' = (-1)^N KEo/\pi fe \sin(\pi fre/3fo) \quad (9)$$
N = 0, 2, 4, . . . : positive half cycle
N = 1, 3, 5, . . . : negative half cycle These equations (8) and (9) show the amount of unbalance $$\Delta ET \frac{(=ET'(N) - ET'(N+1))}{2}$$

between the positive and negative half cycles of the output voltage of the inverter 4 has a magnitude |K'| when the output fo of the adder/subtracter 9 is close to the frequency fe of the pulsating component ΔEo of the input voltage E of the inverter 4, and a beat phenomenon fluctuating with the frequency (fo–fe) occurs. Even if this magnitude |K'| may be small relative to the first member Eo/3fo of the equation (8), an excessively large current will flow into the induction motor 5 resulting in commutation failure or breakdown of the inverter 4, or the torque of the induction motor 5 will greatly pulsate, because the impedance of the induction motor 5 is small when the value of the frequency (fo–fe) is small.

On the other hand, when the frequency adjusting unit 14 for adjusting the output frequency of the inverter 4 is provided, that is, when the modulation wave generator 72 generates outputs $G_U$ and $G_V$ shown by the solid waveforms in FIG. 5C, and the inverter 4 generates the corresponding output voltage shown by the solid waveform in FIG. 5D, the product ET of the voltage and time in one half cycle of the output voltage of the inverter 4 is given by $$ET(N) = \int_{T_U}^{T_V} (Eo + \Delta Eo)dt \qquad (10)$$
$$= \int_{T_U'+\Delta T_U}^{T_V'+\Delta T_V} (Eo + \Delta Eo)dt$$
$$= Eo/3fo + KEo/2\pi fo[\cos\{2\pi fe(T_V' + \alpha)\} - \cos\{2\pi fe(T_U' + \alpha)\}] + KEo/2\pi fe[\cos\{2\pi fe(T_V' + \Delta T_V) + \alpha\} - \cos\{2\pi fe(T_U' + \Delta T_U) + \alpha\}]$$

where
$N = 0, 2, 4, \ldots$ : positive half cycle
$N = 1, 3, 5, \ldots$ : negative half cycle When the phase difference $\alpha$ between the pulsating component $\Delta Eo$ of the input voltage E of the inverter 4 and the output frequency adjusting factor $\Delta fo$ is $\alpha = 0°$, the second member and third member of the equation (10) cancel each other, and the equation (10) is expressed as $ET'(N) = Eo/3fo$. Thus, the amount of unbalance $$\frac{(=ET(N) - ET(N+1))}{2}$$

between the positive and negative half cycles of the output voltage of the inverter 4 is equal to zero, and an undesirable beat phenomenon of the output voltage of the inverter 4 is suppressed.

In an electric railway car using an inverter, the inverter is saturated with its maximum voltage at a speed about ½ of the rate speed of the car, and the frequency only is controlled at higher speeds, in order to enhance the voltage withstand capability of GTO thyristors constituting the inverter. Therefore, at speeds higher than about ½ of the rated speed of the car, the inverter is placed in the stage of single pulse control where adjustment of the output voltage of the inverter is impossible. On the other hand, the output frequency of the inverter is continuously changed over the entire speed range of the car. Therefore, when the a.c. power source 1 shown in FIG. 1 supplies an a.c. voltage of single phase having a frequency of 50 Hz, the frequency of ripples produced during rectification in the converter 2 is 100 Hz. In the speed range in which the output frequency of the inverter 4 passes this frequency of 100 Hz, the inverter 4 has already been placed in the stage of single pulse control (fo≧fol in FIG. 3).

By application of the aforementioned principle of the present invention to such a case, the beat phenomenon between the frequency of ripples included in the output of the converter 2 and the frequency of the output of the inverter 4 can be effectively suppressed, so that the speed of the electric railway car using the inverter can be smoothly controlled.

In order to confirm the effectiveness of the control according to the embodiment of the present invention described above, a super computer was used for digital simulation of the performance of the apparatus under the following conditions. The induction motor 5 had a capacity of 130 KW with its voltage rating of 1,100 V, current rating of 86.7 A and frequency rating of 75 Hz, and its slip frequency command fs was maintained at 3 Hz. The input voltage E of the inverter 4 was expressed by the equation (1) in which the d.c. component Eo, the ripple factor K and the frequency fe of the pulsating component $\Delta Eo$ were 1,500 V, 6% and 100 Hz, respectively.

Figure 6A:
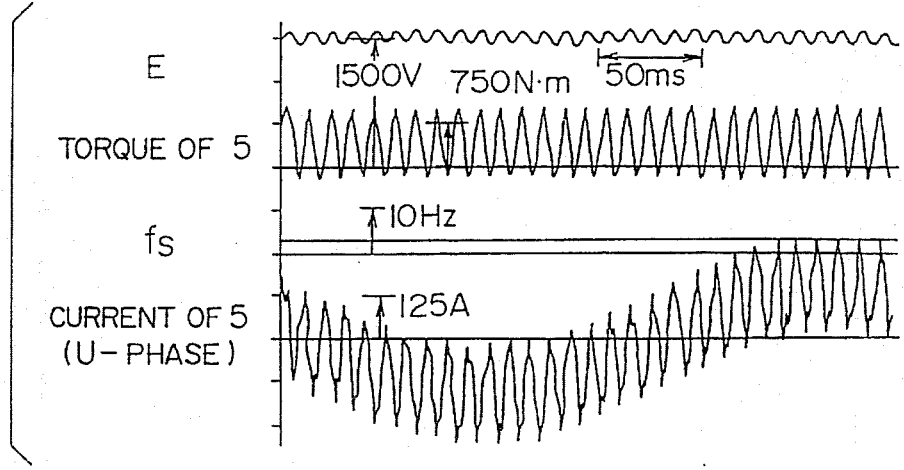
FIGS. 6A, 6B and 6C show simulated waveforms of the current and torque of the induction motor.
Figure 6B:
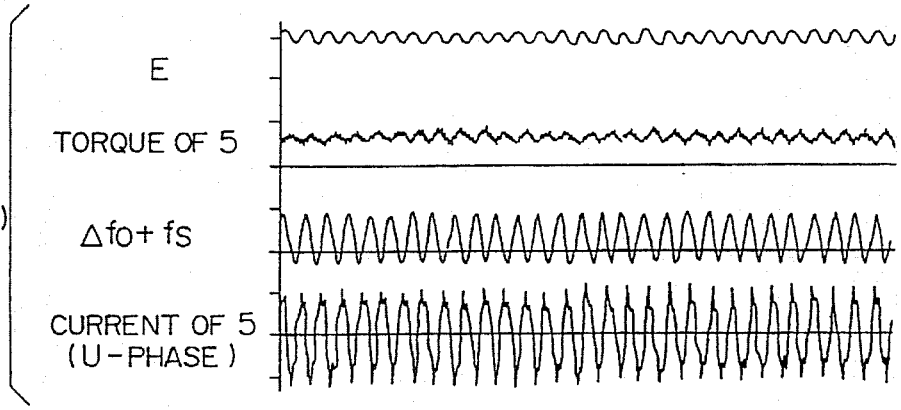
Figure 6C:
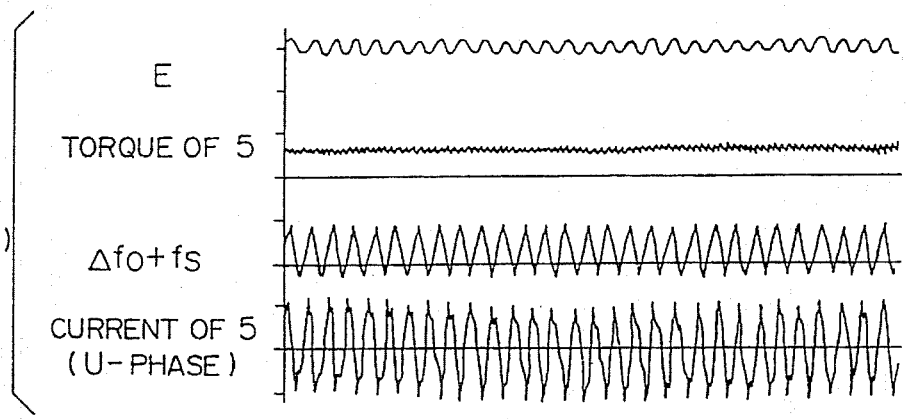

FIGS. 6A to 6C show the results of the digital simulation when the reference frequency command fo for the output frequency of the inverter 4 was 103 Hz. (The rotation frequency fn of the induction motor 5 was fn= 100 Hz). FIG. 6A shows the result of the digital simulation when the adjusting factor $\Delta fo$ for adjusting the output frequency of the inverter 4 was not used. It will be seen in FIG. 6A that the current of the induction motor 5 beats greatly with the frequency (fo–fe)=3 Hz due to an unbalance between the positive and negative half cycles of the output voltages of the inverter 4 as described already. It will also be seen in FIG. 6A that the torque of the induction motor 5 pulsates greatly with the frequency fe (= 100 Hz) of the pulsating component $\Delta Eo$ of the input voltage E of the inverter 4. FIG. 6B shows the result of the digital simulation when the frequency command $\underline{f}$ for the output frequency of the inverter 4 was adjusted by the output $\Delta fo$ of the frequency adjusting unit 14 provided for adjusting the output frequency of the inverter 4, and the value of $\alpha$ in the equation (2) was set at $\alpha = 0°$. It will be seen in FIG. 6B that the beat phenomenon of the current of the induction motor 5 is substantially eliminated. It will also be seen in FIG. 6B that, although the torque of the induction motor 5 pulsates still slightly, the degree of torque pulsation is greatly decreased as compared to that shown in FIG. 6A. FIG. 6C shows the result of the digital simulation when the value of $\alpha$ in the equation (2) was finally set at $\alpha = -5°$ so as to further decrease the degree of pulsation of the torque of the induction motor 5. It will be seen in FIG. 6C that the current of the induction motor 5 is substantially beat-free as in the case of FIG. 6B, and the torque of the induction motor 5 is substantially free from pulsation. Thus, it has been found that, from the aspect of minimizing the pulsation of the torque of the induction motor 5, $\alpha$ in the equation (2) is preferably set at a suitable value.

Figure 8:
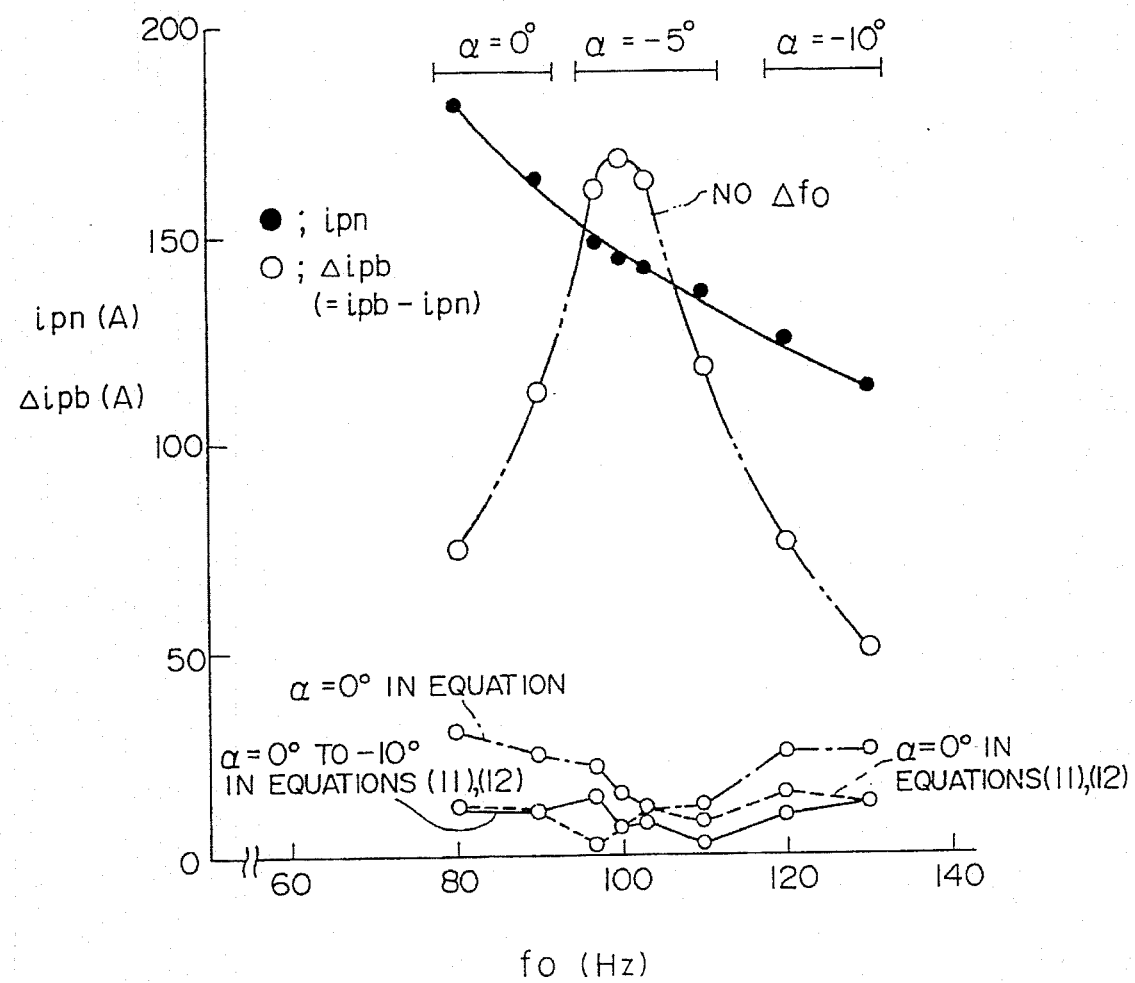
Figure 9:
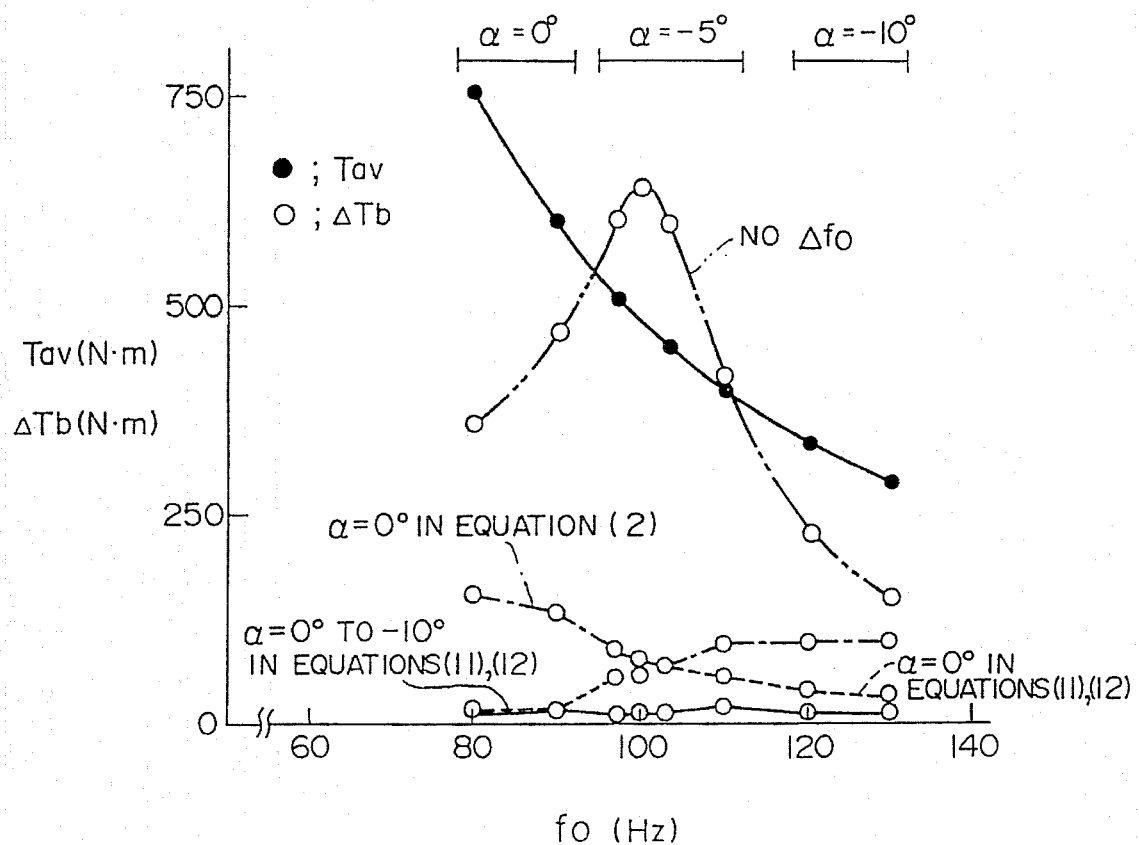

The symbols relating to the current and torque of the induction motor 5 are defined as shown in FIGS. 7A and 7B. In FIG. 7A, the peak current and average torque of the induction motor 5, when no pulsating component $\Delta Eo$ is included in the input voltage E of the inverter 4, are defined as $i_{pn}$ and $T_{av}$ respectively. On the other hand, in FIG. 7B, an increment of the peak current of the induction motor 5 and an amount of pulsation on the ripple of the torque of the induction motor 5, when the input voltage E of the inverter 4 includes a pulsating component Eo, are defined as $\Delta i_{pb}$ ($=i_{pb}-i_{pn}$) and $\Delta T_b$ respectively. FIGS. 8 and 9 show the results of simulation of $\Delta i_{pb}$ ($i_{pn}$) and $\Delta T_b$ ($T_{av}$) respectively when the reference frequency command fo for the output frequency of the inverter 4 was set at various values.

It will be seen in FIGS. 8 and 9 that, when adjusting factor $\Delta fo$ for adjusting the output frequency of the inverter 4 is not used, the increment $\Delta i_{pb}$ (FIG. 8) of the peak current of the induction motor 5 and the ripple $\Delta T_b$ (FIG. 9) of the torque of the induction motor 5 become maximum, as shown by two-dot chain curves, at a point where the reference frequency command fo for the output frequency of the inverter 4 is approximately equal to the frequency fe (= 100 Hz) of the pulsating component $\Delta Eo$ of the input voltage E of the inverter 4. The values of $\Delta i_{pb}$ and $\Delta T_b$ are greatly decreased as shown by the one-dot chain curves in FIGS. 8 and 9 when the frequency command $\underline{f}$ for the output frequency of the inverter 4 is adjusted by the output $\Delta fo$ of the frequency adjusting unit 14 adjusting the output frequency of the inverter 4 while setting the value of $\alpha$ in the equation (2) at $\alpha = 0°$. However, in the range where the difference between fo and fe (= 100 Hz) is large, the values of $\Delta i_{pb}$ and $\Delta T_b$ are slightly larger than when fo is approximately equal to fe. In order to improve such a situation, a unit 16 is provided for correcting the output $\Delta fo$ of the frequency adjusting unit 14 adjusting the output frequency of the inverter 4. This correcting unit 16 generates an output Kc which is a correction coefficient. The output $\Delta fo$ of the frequency adjusting unit 14 is multiplied in a multiplier 17 by the output Kc of the correcting unit 16, so that the frequency command $\underline{f}$ for the output frequency of the inverter 4 is now expressed as follows:

$$f = fo + \Delta fo' = fo + Kc\Delta f0 \quad (11)$$
$$= fo + KcKfo\sin(2\pi fet + \alpha)$$

Simulation was made using various values of Kc in the equation (11) while maintaining $\alpha$ at $\alpha = 0°$. The results of the simulation have proved that the peak current increment $\Delta i_{pb}$ and torque ripple $\Delta T_b$ of the induction motor 5 can be improved as shown by the dotted curves in FIGS. 8 and 9 when the frequency fe of the pulsating component $\Delta Eo$ of the input voltage E of the inverter 4 is divided in a divider 161 by the rotation frequency fn of the induction motor 5, and the output of the divider 161 is squared in a multiplier 162 as follows:

$$Kc = (Fe/fn)^2 \quad (12)$$

In order to further improve the torque ripple $\Delta T_b$ as described with reference to FIGS. 6A to 6C, the value of $\alpha$ in the equations (11) and (12) was changed relative to the reference frequency command fo for the output frequency of the inverter 4 as shown in FIG. 9. The results have proved that the torque ripple $\Delta T_b$ disappears substantially as shown by the solid curve line in FIG. 9. In this case, the peak current increment $\Delta i_{pb}$ of the induction motor 5 does not change appreciably as shown by the solid curve in FIG. 8.

The results of simulation described above have referred to the case where the number of pulses in the output voltage of the inverter 4 is one as shown in FIG. 5, and the output (the modulation factor) $\gamma$ of the voltage control unit 13 is $\gamma = 1$. Similar results (effects) are obtained even when the number of pulses is larger than one ($\gamma < 1$). The results of simulation in such a case have provided that, when the output of the multiplier 162 is divided in a divider 163 by the modulation factor $\gamma$ so that the output (the correction coefficient) Kc of the unit 16 correcting the input $\gamma fo$ of the unit 14 adjusting the output frequency of the inverter 4 is given by $$Kc = (fe/fn)^2 1/\gamma \quad (13),$$

the values of $\Delta i_{pb}$ and $\Delta T_b$ can be more effectively controlled than when Kc is given by the equation (12). When the induction motor 5 is in its starting stage or is rotating in its low speed range, the value of Kc will become excessively large as will be readily apparent from the equation (12) and (13). Therefore, it is preferable to provide an upper limit of the value of Kc.

Figure 10:
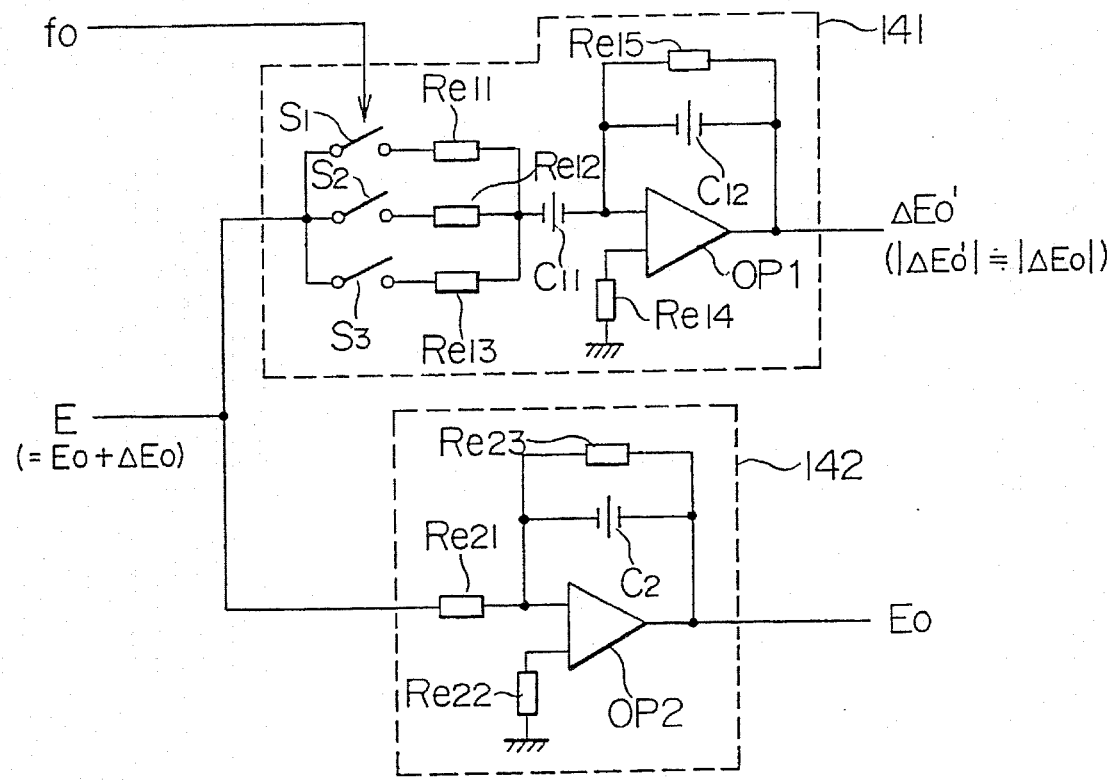
Figure 11:
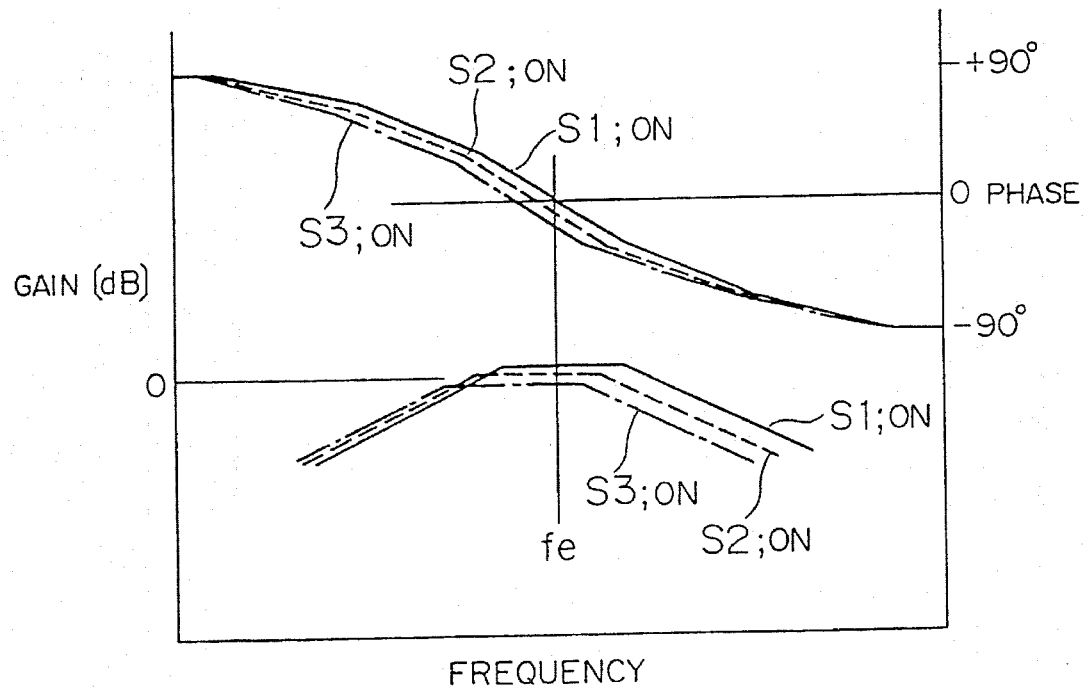
Figure 12:
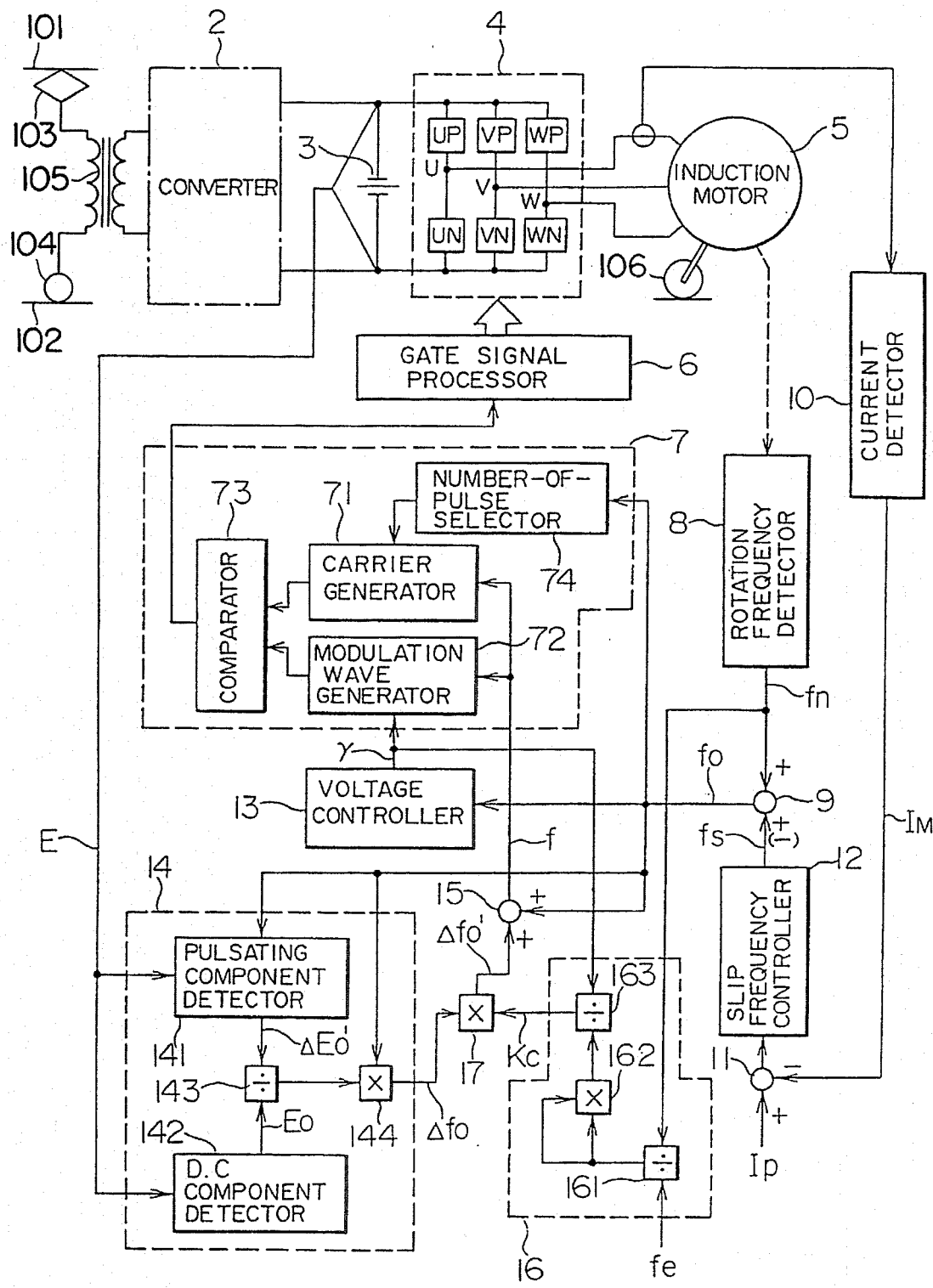
FIG. 12 is a block diagram showing the configuration of one embodiment where the present invention is applied to an electric railway vehicle.

FIG. 10 shows one form of the practical structure of the detector 142 detecting the d.c. component Eo of the input voltage E of the inverter 4 and that of the detector 141 detecting the pulsating component $\Delta Eo$ of the inverter input voltage E. Referring to FIG. 10, the detector 142 detecting the d.c. component Eo of the input voltage E of the inverter 4 is in the form of a smoothing circuit including an operational amplifier OP2, resistors Re 21, Re 22, Re 23 and a capacitor C2. The gain (= Re 23/Re 21) of the smoothing circuit is unity (1), and the time constant (= Re 23×C2) is selected to be large. On the other hand, the detector 141 detecting the pulsating component $\Delta Eo$ of the input voltage E of the inverter 4 is in the form of a band-pass filter circuit including an operational amplifier OP1, resistors Re 11 to Re 15, and capacitors C11, C12. FIG. 12 shows the gain and phase characteristics of this band-pass filter circuit 141. Switches S1, S2 and S3 shown in FIG. 10 are selectively turned on depending on the value of the reference frequency command fo for the output frequency of the inverter 4 as shown in FIG. 11, so that the gain is unity (the value of the input $\Delta Eo \approx$ the value of the output $\Delta Eo'$) at the frequency fe of the pulsating component input $\Delta Eo$ of the input voltage E of the inverter 4, and the phase difference $\alpha$ between the pulsating component input $\Delta Eo$ and the output fo of the unit 14 adjusting the output frequency of the inverter 4 has a value which is appropriate with respect to the reference frequency command fo as described already with reference to FIG. 9.

It will be understood from the foregoing detailed description that the embodiment of the present invention shown in FIG. 1 can suppress a beat phenomenon of the output voltage of the inverter 4 and a beat phenomenon of the current of the induction motor 5 attributable to the pulsating component $\Delta Eo$ (the rectification ripples in the output voltage of the converter 2) included in the input voltage E of the inverter 4. Therefore, any excessively large current does not flow into the induction motor 5 thereby preventing commutation failure or breakdown of the inverter 4, and the torque ripple of the induction motor 5 can also be suppressed to ensure smooth operation of the induction motor 5.

The embodiment shown in FIG. 1 has referred to the case where the number of pulses in the output voltage of the inverter 4 is one as described with reference to FIG. 5. However, it is apparent that the aforementioned effects of the present invention are exhibited even when the number of pulses is larger than one.

As described above, the present invention is applicable to the electric railway vehicle. FIG. 12 is a block diagram showing the configuration of one embodiment where the present invention is applied to the electric railway vehicle.

In FIG. 12, explanation of constituents having the same reference numerals as those shown in FIG. 1 will be omitted. FIG. 12 differs from FIG. 1 in that a single-phase a.c. voltage given between an aerial line (electric car line) 101 and a rail 102 is received between a pantograph (collector) 103 and a wheel 104, and stepped down by a transformer 105 to a lower voltage which is supplied to the converter 2, and that the three-phase induction motor 5 is arranged to drive a movable wheel 106.

Figure 13:
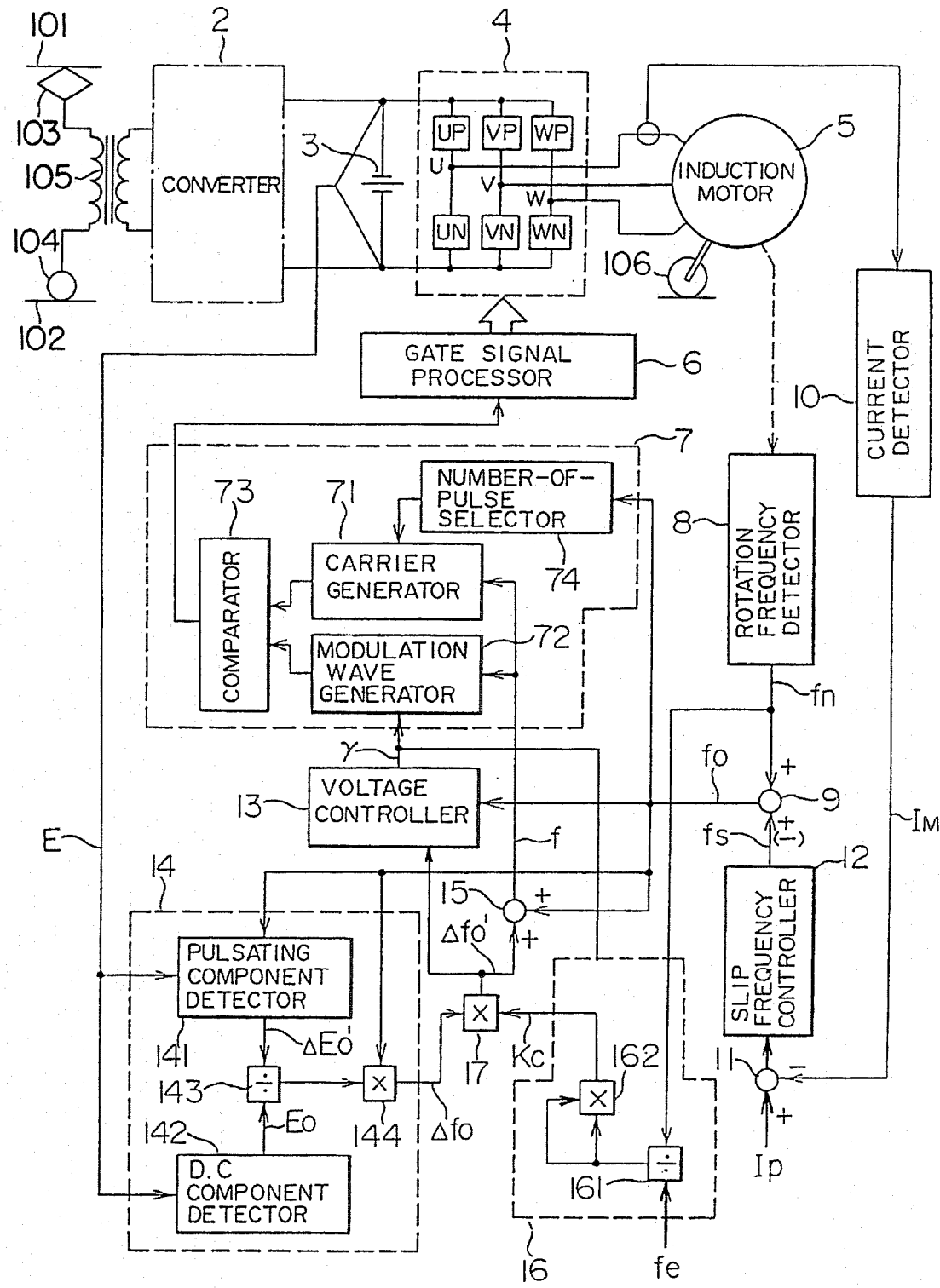
FIG. 13 is a block diagram showing the configuration of another embodiment where the present invention is applied to an electric railway vehicle.

FIG. 13 shows another embodiment where the present invention is applied to the electric railway vehicle.

In FIG. 13, explanation of constituents having the same reference numerals as those in FIG. 12 will be omitted. In FIG. 12, the output correction coefficient Kc for correcting an output frequency adjusting amount $\Delta fo$ of the inverter 4 is reciprocally proportional to the modulation factor $\gamma$ as expressed by the equation (13). On the other hand, in FIG. 13, the divider 163 is removed from the frequency adjusting amount correcting means 16. Instead, the output frequency fo and the output voltage of the inverter 5 are both adjusted by the output $\Delta fo'$ of the multiplier 17 for multiplying the correction coefficient Kc derived as described above by the frequency adjusting amount Δfo. Stated another way, the output Δfo' of the multiplier 17 is also supplied to the voltage controller 13 in addition to the frequency adder 15. In this manner, not only the frequency but also the voltage is adjusted to thereby enhance the effect of suppressing a beat phenomenon.

Figure 14:
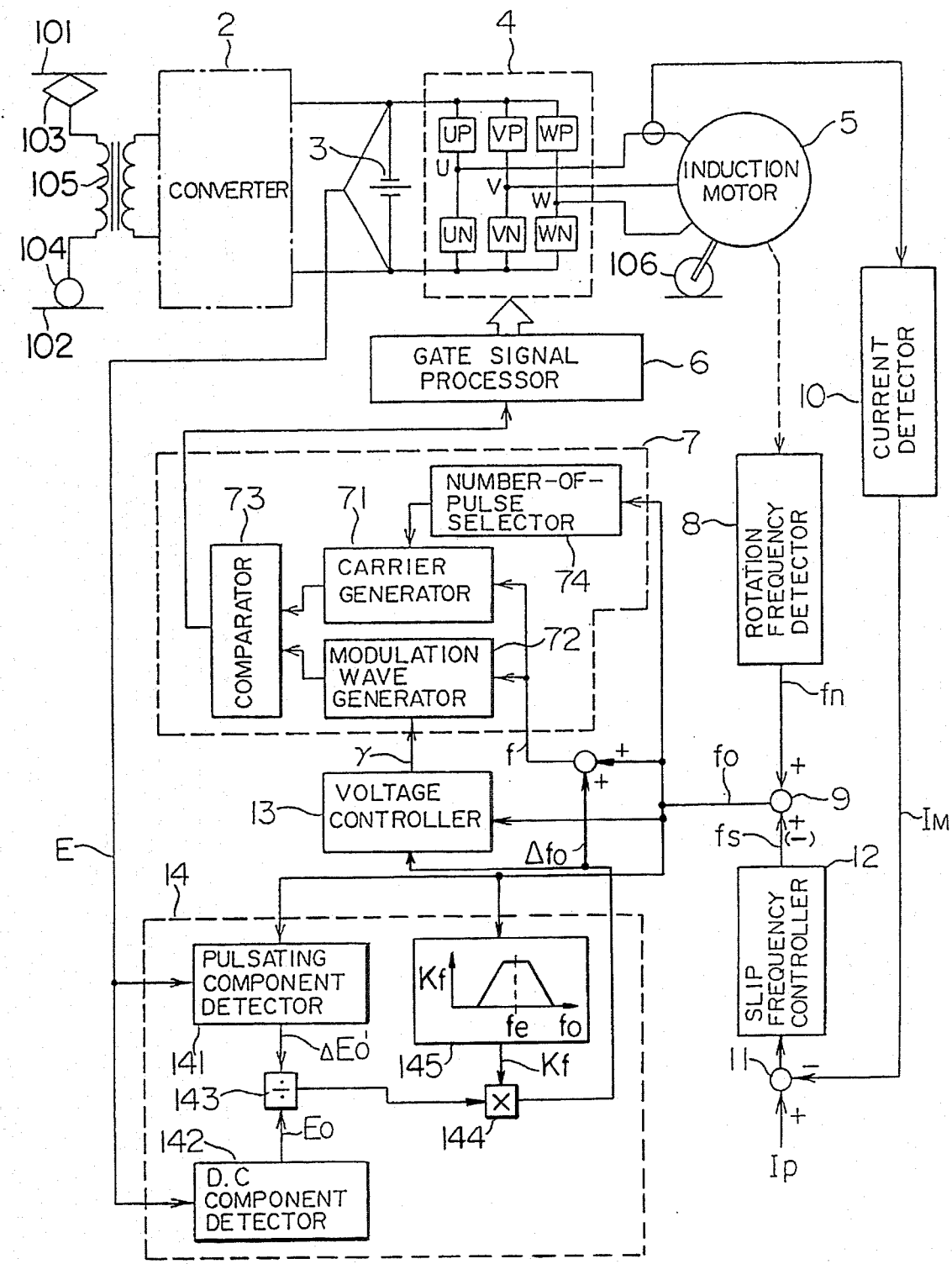
FIG. 14 is a block diagram showing the configuration of a further embodiment where the present invention is applied to an electric railway vehicle.

FIG. 14 shows another embodiment where the present invention is applied to the electric railway vehicle. In FIG. 14, the adjusting amount correcting means 16 is removed, and a function generating unit 145 is provided in the frequency adjusting unit 14. This function generating unit 145 receives an output frequency command fo for the inverter, adjusts the same using a predetermined function, and supplies the adjusted output frequency command fo to the multiplier 144. The control scheme is simplified, for example, such that:

(1) if the frequency command fo is within a predetermined frequency band including the rectification ripple frequency fe, a predetermined relatively large function is selected;

(2) if the frequency command fo is below the predetermined frequency band, the adjusting amount Δfo is increased in accordance with an increase of the command fo; and (3) if the frequency command fo is above the predetermined frequency band, the adjusting amount Δfo is decreased in accordance with an increase of the command fo.

Also, in a frequency band so narrow that the beat phenomenon due to the rectification ripples itself can be ignored (the above (2), (3)), the adjusting amount Δfo is prevented from exerting bad influences on the control system.

Incidentally, it goes without saying in the foregoing explanation that when the output frequency of the inverter or its command is used, a signal substantially equivalent to this may be employed. For example, the inverter frequency may be replaced by a rotational frequency fn of the motor 5, a speed signal of the vehicle, or the like.

As described above, the present invention can suppress a beat phenomenon of the output voltage of the inverter and a beat phenomenon of the current of the induction motor attributable to the pulsating component (the rectification ripples in the output voltage of the converter) included in the input voltage of the inverter. Therefore, the present invention provides the following advantages:

1) Any excessively large current does not flow into the induction motor.

2) Commutation failure or breakdown of the inverter can be prevented.

3) The torque ripple of the induction motor can be suppressed to ensure smooth operation of the induction motor.

We claim:

1. An electric railway vehicle control system comprising:
   means for receiving a single-phase a.c. voltage;
   a convertor for converting said single-phase a.c. voltage to a d.c. voltage;
   a PWM inverter for inverting the d.c. output of said convertor to a variable frequency a.c. voltage;
   a three-phase induction motor supplied with the a.c. output of said inverter to drive electric railway vehicles;
   means for commanding an output frequency of said inverter;
   means for controlling the output frequency of said inverter in accordance with a frequency command of said commanding means;
   means for controlling the output voltage of said inverter in both of:
   a) a variable voltage, variable frequency (VVVF) control mode for changing the output voltage of said inverter substantially relative to a change in the output frequency of said inverter; and
   b) a constant voltage, variable frequency (CVVF) control mode for fixing the output voltage of said inverter to a substantially constant value;
   means for detecting a rectification ripple in a frequency band including a frequency double the frequency of said single-phase a.c. voltage, included in the d.c. input voltage to said inverter; and
   means for adjusting the output frequency of said inverter in accordance with an output of said rectification ripple detecting means.

2. An electric railway vehicle control system according to claim 1, wherein:
   a plurality of pulses are included in each half cycle of the output voltage of said inverter in said variable voltage, variable frequency (VVVF) control mode; and
   a single pulse is included in each half cycle of the output voltage of said inverter in said constant voltage, variable frequency (CVVF) control mode.

3. An electric railway vehicle control system according to claim 1, wherein said means for adjusting the output frequency of said inverter comprises means for decreasing a frequency adjusting amount with respect to the magnitude of said rectification ripple as the output frequency of said inverter increases.

4. An electric railway vehicle control system according to claim 1, wherein the output voltage of said inverter includes a beat phenomenon occurring in response to the rectification ripple included in the d.c. input voltage to said inverter, and said adjusting means enables minimization of the beat phenomenon.

5. An electric railway vehicle control system comprising:
   means for receiving a single-phase a.c. voltage;
   a converter for converting said single-phase a.c. voltage to a d.c. voltage;
   a PWM inverter for inverting the d.c. output of said converter to a variable frequency a.c. voltage;
   a three-phase induction motor supplied with the a.c. output of said inverter to drive railway vehicles;
   means for commanding an output frequency of said inverter;
   means for controlling the output frequency of said inverter in accordance with a frequency command of said commanding means;
   means for controlling the output voltage of said inverter in both of:
   a) a variable voltage, variable frequency (VVVF) control mode for changing the output voltage of said inverter substantially relative to a change in the output frequency thereof; and
   b) a constant voltage, variable frequency (CVVF) control mode for fixing the output voltage of said inverter to a substantially constant value;
   means for detecting a rectification ripple included in the d.c. input voltage to said inverter; and
   means for adjusting the output frequency of said inverter in accordance with an output of said rectification ripple detecting means such that the product of voltage and time in each positive half cycle of the output voltage of said inverter approaches that in the next adjacent negative half cycle of the output voltage of said inverter.

6. An electric railway vehicle control system according to claim 5, wherein the output voltage of said inverter includes a beat phenomenon occurring in response to the rectification ripple included in the d.c. input voltage to said inverter and said adjusting means enables minimization of the beat phenomenon.

7. An electric railway vehicle control system comprising:
   means for receiving a single-phase a.c. voltage;
   a converter for converting said single-phase a.c. voltage to a d.c. voltage;
   a PWM inverter for inverting the d.c. output of said converter to a variable frequency a.c. voltage;
   a three phase induction motor supplied with the a.c. output of said inverter to drive railway vehicles;
   means for commanding an output frequency of said inverter;
   means for controlling the output frequency of said inverter in accordance with a frequency command of said commanding means;
   means for controlling the output voltage of said inverter in both of:
   a) a variable voltage, Variable frequency (VVVF) control mode for changing the output voltage of said inverter substantially relative to a change in the output frequency thereof; and
   b) a constant voltage, variable frequency (CVVF) control mode for fixing the output voltage of said inverter to a substantially constant value;
   means for detecting a rectification ripple included in the d.c. input voltage to said inverter; and
   means for adjusting the output frequency of said inverter in accordance with an output of said rectification ripple detecting means so as to reduce an undesirable beat phenomenon caused by said rectification ripple.

8. An electric railway vehicle control system according to claim 7, wherein the output voltage of said inverter includes a beat phenomenon occurring in response to the rectification ripple included in the d.c. input voltage to said inverter, and enables minimization of the beat phenomenon.

9. An electric railway vehicle control system comprising:
   a converter for converting an a.c. voltage to a d.c. voltage;
   a PWM inverter for inverting the d.c. output of said converter to a variable frequency a.c. voltage;
   a three-phase induction motor supplied with the a.c. output of said PWM inverter to drive railway vehicles;
   means for commanding an output frequency of said inverter;
   means for controlling the output frequency of said inverter in accordance with a frequency command of said commanding means;
   means for controlling the output voltage of said inverter in both of:
   a) a variable voltage, variable frequency (VVVF) control mode for changing the output voltage of said inverter substantially relative to a change in the output frequency thereof; and
   b) a constant voltage, variable frequency (CVVF) control mode for fixing the output voltage of said inverter to a substantially constant value;
   means for detecting a ripple in a band including a frequency double the number of phases of said a.c. voltage, included in the d.c. input voltage to said inverter; and
   means for adjusting the output of said inverter in accordance with an output of said ripple detecting means.

10. An electric railway vehicle control system according to claim 9, wherein the output voltage of said inverter includes a beat phenomenon occurring in response to the rectification ripple included in the d.c. input voltage to said inverter, and said adjusting means enables minimization of the beat phenomenon.

11. An electric railway vehicle control system comprising:
   a converter for converting an a.c. voltage to a d.c. voltage;
   a PWM inverter for inverting the d.c. output of said converter to a variable voltage, variable frequency a.c. voltage;
   a three-phase induction motor supplied with the a.c. output of said inverter to drive railway vehicles;
   means for commanding an output frequency of said inverter;
   means for controlling the output frequency of said inverter in accordance with a frequency command of said commanding means;
   means for controlling an output voltage of said inverter in both of:
   a) a variable voltage, variable frequency (VVVF) mode for changing the output voltage of said inverter substantially relative to a change in the output frequency thereof; and
   b) a constant voltage, variable frequency (CVVF) mode for fixing the output voltage of said inverter to a substantially constant value;
   means for detecting a ripple in a band including a frequency double the number of phases of said a.c. voltage, included in the d.c. input voltage of said invertor; and
   means for adjusting at least one of the output frequency and the output voltage of said inverter in accordance with an output of said ripple detecting means.

12. An electric railway vehicle control system according to claim 11, wherein the output voltage of said inverter includes a beat phenomenon occurring in response to the rectification ripple included in the d.c. input voltage to said inverter, and said adjusting means enables minimization of the beat phenomenon.

13. An electric railway vehicle control system comprising:
   means for receiving a single-phase a.c. voltage;
   a converter for converting said single-phase a.c. voltage to a d.c. voltage;
   PWM inverter for inverting the d.c. output of said converter to a variable voltage, variable frequency a.c. voltage;
   a three-phase induction motor supplied with the a.c. output of said PWM inverter to drive railway vehicles;
   means for commanding an output frequency of said inverter;
   means for controlling the output frequency of said inverter in accordance with a frequency command of said commanding means;
   means for controlling an output voltage of said inverter in both of:
   a) a variable voltage, variable frequency (VVVF) control mode for changing an output voltage of said inverter substantially relative to a change in the output frequency thereof; and b) a constant voltage, variable frequency (CVVF) control mode for fixing the output voltage of said inverter to a substantially constant value;

means for detecting a rectification ripple included in the d.c. input voltage to said inverter;

means for adjusting the phase of the output of said ripple detecting means in accordance with the output frequency of said inverter or a value corresponding thereto; and means for adjusting the output of said inverter in accordance with an output of said rectification ripple detecting means.

14. An electric railway vehicle control system according to claim 13, wherein said phase adjusting means comprises means for selecting a phase from a plurality of previously prepared different phases in accordance with the output frequency of said inverter.

15. An electric railway vehicle control system according to claim 13, wherein the output voltage of said inverter includes a beat phenomenon occurring in response to the rectification ripple included in the d.c. input voltage to said inverter, and said adjusting means enables minimization of the beat phenomenon.

16. An electric railway vehicle control system comprising:

means for receiving a single-phase a.c. voltage;

a converter for converting said single phase a.c. voltage to a d.c. voltage;

a PWM inverter for inverting the d.c. output of said converter to a variable voltage, variable frequency a.c. voltage;

a three-phase induction motor supplied with the a.c. output of said PWM inverter to drive railway vehicles;

means for commanding an output frequency of said inverter;

means for controlling the output frequency of said inverter in accordance with a frequency command of said commanding means;

means for controlling the output voltage of said inverter in both of:
 a) a variable voltage, variable frequency (VVVF) control mode for changing the output voltage of said inverter substantially relative to a change in the output frequency thereof; and
 b) a constant voltage, variable frequency (CVVF) control mode for fixing the output voltage of said inverter to a substantially constant value;

means for detecting a rectification ripple included in the d.c. input voltage to said inverter;

means for adjusting an output of said ripple detecting means in accordance with the output frequency of said inverter or a value corresponding thereto so that the output of said ripple detecting means becomes larger when the output frequency of said inverter lies within a predetermined band including a frequency double the frequency of said single-phase a.c. voltage than when the output frequency of said inverter is out of the predetermined band; and means for adjusting the output of said inverter in accordance with the output of said rectification ripple detecting means.

17. An electric railway vehicle control system according to claim 16, wherein said means for adjusting the output of said ripple detecting means comprises means for increasing the output of said ripple detecting means with an increase of the output frequency of said inverter in a frequency band lower than said predetermined band, and decreasing the output of said ripple detecting means with an increase of the output frequency of said inverter in a frequency band higher than said predetermined band.

18. An electric railway vehicle control system according to claim 16, wherein the output voltage of said inverter includes a beat phenomenon occurring in response to the rectification ripple included in the d.c. input voltage to said inverter, and said adjusting means enables minimization of the beat phenomenon.

19. An electric railway vehicle control system comprising:

means for receiving a single-phase a.c. voltage;

a converter for converting said single-phase a.c. voltage to a d.c. voltage;

a PWM inverter for inverting the d.c. output of said converter to a variable voltage, variable frequency a.c. voltage;

a three-phase induction motor supplied with the a.c. output of said inverter to drive railway vehicles;

means for commanding an output frequency of said inverter;

means for controlling the output frequency of said inverter in accordance with a frequency command of said output frequency commanding means;

means for controlling an output voltage of said inverter in both of:
 a) a variable voltage, variable frequency (VVVF) control mode for changing the output voltage of said inverter substantially relative to a change in the output frequency; and
 b) a constant voltage, variable frequency (CVVF) mode for fixing the output voltage of said inverter to a substantially constant value;

means for detecting the rate of a rectification ripple included in the d.c. input voltage to said inverter; and means for adjusting at least one of the output frequency and the output voltage of said inverter in accordance with an output of said rectification ripple rate detecting means.

20. An electric railway vehicle control system according to claim 19, wherein said means for adjusting at least one of the output frequency and the output voltage comprises means for adjusting at least one of the output frequency and the output voltage in accordance with said rectification ripple rate.

21. An electric railway vehicle control system according to claim 19, wherein the output voltage of said inverter includes a beat phenomenon occurring in response to the rectification ripple included in the d.c. input voltage to said inverter, and said adjusting means enables minimization of the beat phenomenon.

* * * * *

UNITED STATES PATENT AND TRADEMARK OFFICE
CERTIFICATE OF CORRECTION

PATENT NO. : 5,532,569
DATED      : Jul. 2, 1996
INVENTOR(S): Tanamachi, et al

It is certified that error appears in the above-indentified patent and that said Letters Patent is hereby corrected as shown below:

Title page, add item [30] Foreign application priority data as follows:

--[30]    Foreign Application Priority Data

June 3, 1987 [JP]  Japan    62-138089
      Sept. 30, 1987 [JP] Japan    62-243804--.

Signed and Sealed this

Third Day of December, 1996

Attest:

BRUCE LEHMAN

*Attesting Officer*    *Commissioner of Patents and Trademarks*